UNITED STATES PATENT OFFICE.

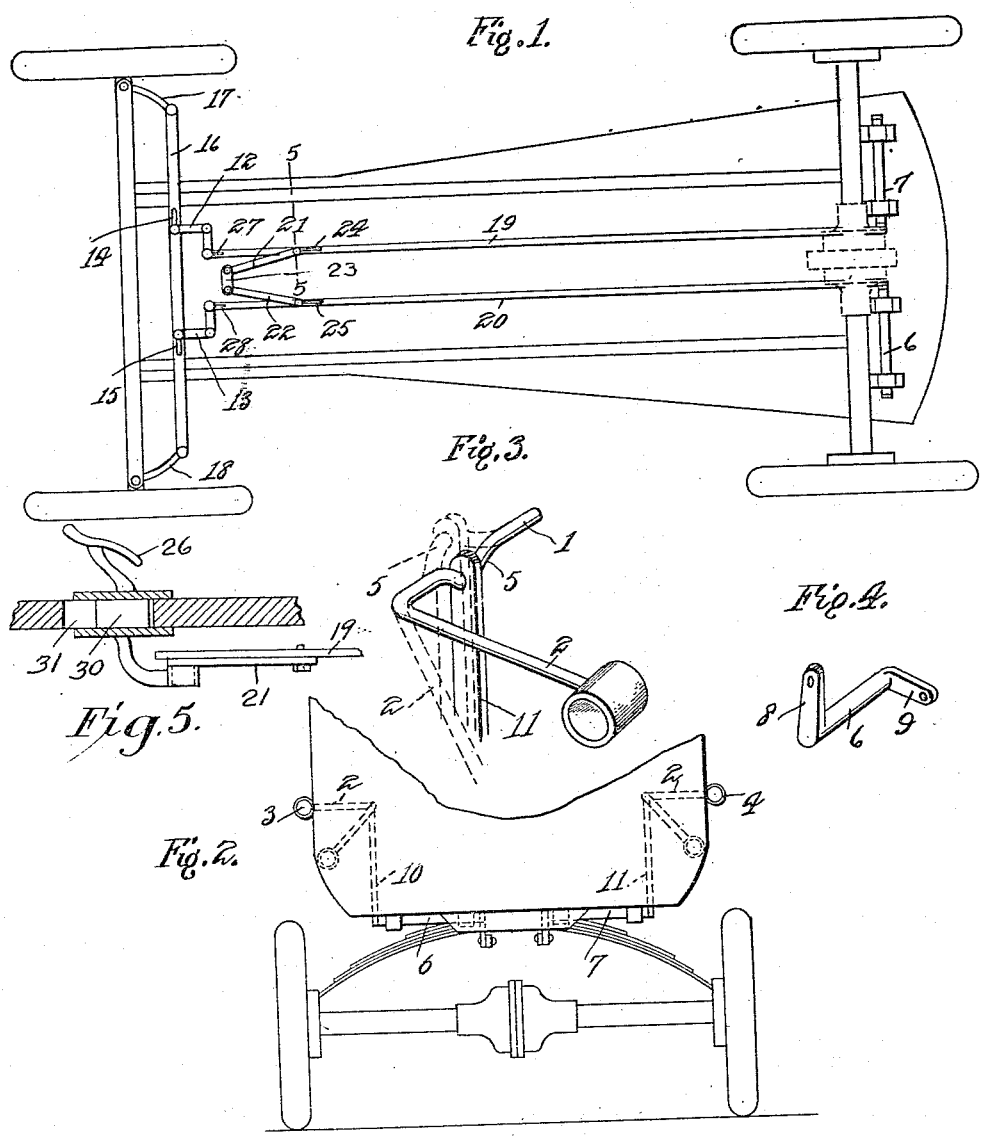

DAVID HAMPTON EWING, OF SAN FRANCISCO, CALIFORNIA.

VEHICLE TRAFFIC-SIGNAL.

1,285,085.     Specification of Letters Patent.     Patented Nov. 19, 1918.

Application filed March 9, 1917. Serial No. 153,666.

*To all whom it may concern:*

Be it known that I, DAVID H. EWING, a citizen of the United States, residing at San Francisco, in the county of San Francisco and State of California, have invented certain new and useful Improvements in Vehicle Traffic-Signals, of which the following is a specification.

This invention relates to an improvement in traffic signals for vehicles, and more particularly to a device of this character which is intended to be constructed and attached in conjunction with the steering gear so that as the vehicle may be turned to the one side or the other in traveling either forwardly or rearwardly, indication of this change of the course will be made automatically.

An object of my invention is to provide a structure which may be embodied with the parts of an automobile as the same is being built at the factory or may be placed in conjunction therewith by the individual user, and which structure is so arranged that as the steering gear of the vehicle is operated signals or signal lamps will be moved to give indication of the course of travel which the vehicle is to take.

A further object is to so construct the parts that signal means is provided on each side of the vehicle body thus making the indication very clearly understandable to parties in the rear of the vehicle and which means is connected with the steering gear in such a manner that actuation of the light on one side to indicate turning in that direction will not affect the remaining light or signal device.

Yet another object is to provide means by which both of the signal lights or signal means may be brought to the visible position simultaneously to indicate that the vehicle is to stop, and which means might be arranged and connected in conjunction with the brake means of the vehicle.

With the above and other objects in view, my invention consists in certain novel features of construction and combinations of parts which will be hereinafter set forth in connection with the drawings and then more particularly pointed out in the claims.

In the drawings:—

Figure 1 is a diagrammatic view of a vehicle running gear showing the manner of applying the mechanism of my invention thereto.

Fig. 2 is an elevational view of the rear end of a vehicle with my invention fitted thereto.

Fig. 3 is a detail view showing the lamp or signal moving means.

Fig. 4 is a detail perspective view showing a portion of the carrying mechanism of the operating means.

Fig. 5 is a sectional view on line 5—5 of Fig. 1, showing the pedal operating means.

It is the intention that the device of my invention shall be fitted to an automobile or other vehicle when the same is being manufactured or may be constructed as an attachment to be applied by the individual user, and in either adaptation the structure will be arranged in substantially the same manner and will have an identical operation. The crank shaft portions 1 are mounted at each side on the rear portion of the body of the vehicle or might be constructed and embodied in the body part, and these crank shafts 1 have the signal arms 2 extending therefrom substantially at right angles, the lamps 3 and 4 being mounted on the ends of the signal arms 2. It is preferable that the shafts 1 be so mounted that the weight of the lamps upon the signal arms will normally swing the same to the relation shown in dotted lines in Fig. 2 where the lamps will be obscured behind a portion of the body structure, and in this relation the crank portions 5 of the crank operating shafts 1 will be disposed in substantially the position shown in the dotted lines in Fig. 3. Shafts 6 and 7 are mounted below the mounting of the operating shafts 1 and are disposed substantially at right angles to the extent thereof, these shafts 6 and 7 being provided with arms 8 and 9 at their ends, which arms are disposed at an angle of 90° one from the other. The links 10 and 11 are connected between the arms 9 of the shafts 6 and 7 and the cranks 5 of the shafts 1 by which the signal lamps 3 and 4 are actuated, and thus as the shafts 6 and 7 may be turned through swinging movement imparted to the arms 8 thereof, the signal lamps 3 and 4 will be raised to the position shown in full lines in Fig. 2 and will be visible.

It is my intention that the signal lamps shall not both be disposed for view except under certain circumstances such as when the vehicle is about to stop, and on the other hand it is desired that the signal lamps be variably exposed or shown to indicate variations in the course of travel of the vehicle. With the above in mind, I arrange the bell crank levers 12 and 13 upon the bottom of the frame or body portion of the vehicle and have one of the arms of each of these bell crank levers received in the slots 14 and 15 of the connecting rod 16 disposed between the steering arms 17 and 18 by which the steering wheels of the vehicle are turned. This connection of the bell crank levers through the slotted openings 14 and 15 so arranges the part that as the connecting bar 16 is moved to the one side or the other in the direction of its length to accomplish turning of the steering wheels and to thus change the course of travel of the vehicle, only one of the bell crank levers will be swung around its mounting on the frame or body construction, it being preferable that the slotted openings of the bar 16 be disposed on the inner side of the bell crank levers 12 and 13 so that the turning of the vehicle will cause swinging of that bell crank lever on the side of the vehicle toward which the turn is to be taken. The links 19 and 20 are connected between the free arms of the bell crank levers 12 and 13 and the arms 8 of the shafts 6 and 7 so that swinging movement of either of the bell crank levers will cause turning movement of the shaft having connection therewith and consequently will cause the signal lamp to be raised or brought to the exposed position.

By the arrangement of the parts in the manner as set forth, as the steering gear is operated the signals, or signal lamps will be brought up to the position to be visible from the rear of the vehicle and thus the course which is to be taken in the travel of the same will be indicated, however, it is preferable that means be provided by which the signals or signal lamps may be actuated to indicate that the vehicle is to stop, and to accomplish this purpose, I connect the arms 21 and 22 with the head 23 so that they will be capable of swinging movement around their points of connection and then extend fastenings through the free ends of these arms and through the slots 24 and 25 in the links 19 and 20. The head 23 has a foot pedal 26 which is provided with a pair of lugs 30, adapted to slide in the lateral slot 31 located in the bottom of the car. The pedal 26 is used to actuate the signal when the vehicle is traveling in a straight course and when pushed forward will have the same function upon the signal means as the turning of the wheels. The head might be directly connected with the foot or hand brakes of the vehicle so that movement of the arms 21 and 22 would occur simultaneously with the setting of the brakes, however, in either operation or movement of the head 23, the arms 21 and 22 will exert drawing tension against the links 19 and 20 and in consequence the shafts 6 and 7 will be swung to raise or move the lamps or signal devices or both be disposed in the visible position or in the position shown in full lines in Fig. 3. Under some circumstances it may be found desirable to provide slotted openings in the ends of the links 19 and 20 as is shown at 27 and 28 so that more or less free connections will be established between these links and the bell crank levers 12 and 13, the parts being thus so arranged that movement of the links 19 and 20 under pressure exerted upon the tread piece 26 or through actuation of the brake means of the vehicle will not be interfered with, and the provision of the slotted openings 24 and 25 allowing free and unrestricted actuation of the parts under the impulse from the movement of the connecting bar 16 of the steering gear.

While in the foregoing description I have set forth that signal lamps are provided as indicated at 3 and 4, it will of course be understood that the device as described might just as readily be signal arms or indicating signals of any desired or approved form and that the same operation would be accomplished, however, if lamps are provided a structure is embodied which permits successful operation of the signal system at night, and further it will be seen that a number of other modifications and variations might be resorted to in the form and arrangement of the several parts of my invention without departing from the spirit and scope thereof or without interfering with the successful and most efficient operation of the device, in view of which fact I do not wish to be limited to the exact disclosure but rather only to such points as may be set forth in the claims:

I claim:

1. A vehicle traffic signal comprising crank operating shafts mounted at the sides of the vehicle and provided with signal means arranged to be brought into indicating view as the shafts are turned, a pair of bell crank levers mounted on the vehicle structure and arranged to each have one of their arms connected with a portion of the steering gear so that as the vehicle is steered movement will be imparted to the bell crank levers, and means arranged between said bell crank levers and the crank operating shafts to cause movement of the signal means to indicating positions during the operation of the vehicle and the steering of the same.

2. A vehicle traffic signal comprising crank operating shafts mounted at the sides of the vehicle and provided with signal means arranged to be brought into indicating view as the shafts are turned, a pair of bell crank levers mounted on the vehicle structure and arranged to each have one of their arms connected with a portion of the steering gear so that as the vehicle is steered movement will be imparted to the bell crank levers, means arranged between said bell bell crank levers and the crank operating shafts to cause movement of the signal means to indicating positions during the operation of the vehicle and the steering of the same, and loose connections formed between said bell crank levers and the remaining parts so that in the operation of the steering mechanism to turn the vehicle in one direction one only of said signal means will be operated.

3. A vehicle traffic signal comprising crank operating shafts mounted at the sides of the vehicle, and provided with signal means arranged to be brought into indicating view as the shafts are turned, a pair of slots provided in the connecting rods of the steering gear, a pair of bell crank levers adapted to have one of their ends loosely connected with said slots, and means arranged between said bell crank levers and operating shafts to cause movement of the signal means to indicating position when the wheels are turned.

4. A vehicle traffic signal comprising a crank operating shaft mounted at the sides of the vehicle, and provided with signal means arranged to be brought into indicating view as the shafts are turned, a second pair of shafts secured beneath the vehicle having arms disposed at an angle of 90 degrees one from the other, links connecting the crank operating shafts with the second mentioned shafts, a pair of slots provided in the connecting rod of the steering gear, a pair of bell crank levers adapted to have one of their ends loosely connected with said slots, and means arranged between said bell crank levers, and the second mentioned shafts to cause movement of the signal means to indicating position when the connecting rod is moved.

In testimony whereof I affix my signature in presence of two witnesses.

DAVID HAMPTON EWING.

Witnesses:
C. L. COLVIN,
M. E. MOORE,

Copies of this patent may be obtained for five cents each, by addressing the "Commissioner of Patents, Washington, D. C."